(12) United States Patent
Crane

(10) Patent No.: US 7,021,180 B2
(45) Date of Patent: Apr. 4, 2006

(54) TORQUE SENSING TOOL

(75) Inventor: David Ogilvie Crane, Lutterworth (GB)

(73) Assignee: Crane Electronics Ltd., Hinckley (GB)

( * ) Notice: Subject to any disclaimer, the term of this patent is extended or adjusted under 35 U.S.C. 154(b) by 0 days.

(21) Appl. No.: 10/509,974

(22) PCT Filed: Mar. 27, 2003

(86) PCT No.: PCT/GB03/01330

§ 371 (c)(1),
(2), (4) Date: Oct. 1, 2004

(87) PCT Pub. No.: WO03/082527

PCT Pub. Date: Oct. 9, 2003

(65) Prior Publication Data

US 2005/0150335 A1  Jul. 14, 2005

(30) Foreign Application Priority Data

Apr. 2, 2002  (GB) ................................. 0207514

(51) Int. Cl.
*B25B 23/14* (2006.01)
(52) U.S. Cl. ........................................ 81/467; 81/480
(58) Field of Classification Search ............... 81/467, 81/472–483; 73/761
See application file for complete search history.

(56) References Cited

U.S. PATENT DOCUMENTS 4,643,030 A * 2/1987 Becker et al. ........... 73/862.23
4,676,109 A   6/1987 Wallace
4,686,859 A   8/1987 Wallace (Continued)

FOREIGN PATENT DOCUMENTS

DE     25 55 982 A    6/1977

(Continued)

*Primary Examiner*—David B. Thomas
(74) *Attorney, Agent, or Firm*—Alan G. Towner, Esq.; Pietragallo Bosick & Gordon LLP

(57) ABSTRACT

A torque applying tool such as a nutrunner or torque wrench incorporates torque sensors responsive to strain in a shaft mounting an output square drive head the strain being measured as it exists immediately adjacent the drive head. The shaft is a hollow quill shaft an outer diameter of which is splined to receive a torque drive input at a location axially spaced from the drive head. A central shaft extends from the drive head centrally up the quill shaft and a flexible cantilever beam is mounted between a cranked end of the central shaft as it extends out of the quill shaft and the corresponding end of the quill shaft. One or more strain sensing transducers, preferably S.A.W. devices, are mounted on the cantilever beam to detect flexure of the beam, and the resulting output signal is passed through an inductive or capacitive coupling for transmission to a CPU and display.

20 Claims, 4 Drawing Sheets

U.S. PATENT DOCUMENTS

| | | | |
|---|---|---|---|
| 4,757,721 A | | 7/1988 | Horner et al. |
| 4,987,806 A | * | 1/1991 | Lehnert ........................ 81/469 |
| 5,112,248 A | * | 5/1992 | Kibblewhite et al. ........ 439/577 |
| 5,115,701 A | * | 5/1992 | Lehnert ........................ 81/467 |
| 5,181,575 A | * | 1/1993 | Maruyama et al. .......... 173/180 |
| 5,226,327 A | * | 7/1993 | Fassina ......................... 73/761 |
| 5,404,775 A | * | 4/1995 | Abe .............................. 81/469 |
| 5,898,379 A | * | 4/1999 | Vanbergeijk ................. 340/680 |
| 6,070,506 A | * | 6/2000 | Becker ......................... 81/479 |

FOREIGN PATENT DOCUMENTS

| | | |
|---|---|---|
| DE | 37 14 140 A | 11/1988 |
| DE | 4307131 A1 * | 9/1994 |
| WO | WO 91 00989 A | 1/1991 |
| WO | WO 01 33180 A | 5/2001 |
| WO | WO 01 67058 A | 9/2001 |

* cited by examiner

TORQUE SENSING TOOL

FIELD OF THE INVENTION

The invention relates to torque applying tools, such as nutrunners and torque wrenches, incorporating torque sensors.

BACKGROUND INFORMATION

In torque applying tools such as nutrunners and torque wrenches it is desirable to incorporate a display or printout indicating the torque applied by the tool during use of the tool to tighten threaded fasteners. In assembly line production a tool may be set to tighten bolts to a predetermined torque setting, for example. It is desirable to have a visual display or print-out of the torque actually applied, for quality control and safety purposes. For that reason, torque wrenches and nutrunners often have associated displays of sensed applied torque.

Often however the sensed torque is little more than approximation or estimate of the torque actually applied to the bolt or other threaded fastener. It has never been possible to sense the torque at the drive head itself of the tool due to space limitations at the drive head. The torque sensors or strain gauges necessary to measure the applied torque have typically been spaced along the side handle of a torque wrench or along the drive train between a motor and a bevel drive gear of a nutrunner. It has generally been accepted that errors between the torque as measured at a point somewhat distant from the drive head and the torque exerted by the drive head are small in comparison with the torques being imposed; and are inevitable and unavoidable. The errors may arise, for example, from friction between the meshing teeth of the bevel gears of a nutrunner, or may take the form of cyclical errors arising from inaccuracies In the grinding of those teeth or in the bearings for the drive head. Nevertheless those errors do exist and limit the accuracy of torque sensing in known tools.

SUMMARY OF THE INVENTION

It is an object of the invention to provide a torque applying tool incorporating a torque sensor which more accurately senses torque at the drive head of the tool.

The invention provides a torque applying tool comprising a torque wrench or nutrunner having handle means and a drive head for torque output; wherein the drive head is located at one end of a hollow quill shaft an outer diameter of which is splined to receive a torque drive input at a location axially spaced from the drive head; a central shaft extends from the drive head up the hollow centre of the quill shaft; and the ends of the hollow quill shaft and the central shaft remote from the drive head mount opposite ends of a flexible cantilever beam on a face of which or on opposed faces of which are mounted one or more strain sensing transducers the output or outputs of which represent sensed torque applied by the drive head.

The transducers, preferably two in number on opposed faces of the cantilever beam, are preferably Surface Acoustic Wave (S.A.W.) transducers which are capable of providing accurate digital outputs even at low strain levels. S.A.W. transducers are available with a quartz substrate, with high Q factors which means that they can store and re-store energy efficiently.

In a nutrunner the drive head rotates relative to the handle means. In a torque wrench with a ratchet handle the drive head may similarly rotate relative to the handle means. In either case the one or more strain transducers similarly rotate relative to the handle means. The outputs of such rotary strain sensing transducers are preferably transmitted to a non-rotary element in the handle via slip rings or across an air gap. For example the transducer outputs may be transmitted by a high frequency, preferably radio frequency, coupling between a rotary coupling element connected to the drive head and a non-rotary coupling element connected to the handle means. The coupling elements may for example be the elements of an inductive or a capacitive coupling. The output from the transducer or transducers may then be taken from the non-rotary coupling element either by a wired connection to a processor and display or via a patch antenna carried by the handle means, which transmits the output to a remote receiver, processor and display.

DETAILED DESCRIPTION

The drawings all relate to powered nutrunners in which an output square drive head is driven by a motor through a gearbox and bevel gear. However it will be understood that the invention is equally applicable to torque wrenches which have a similar output square drive head connected, optionally through a ratchet mechanism, to a side arm handle through which torque is applied manually. In both cases the torque is applied to a splined shaft which terminates in the output square drive head.

Figure 1:
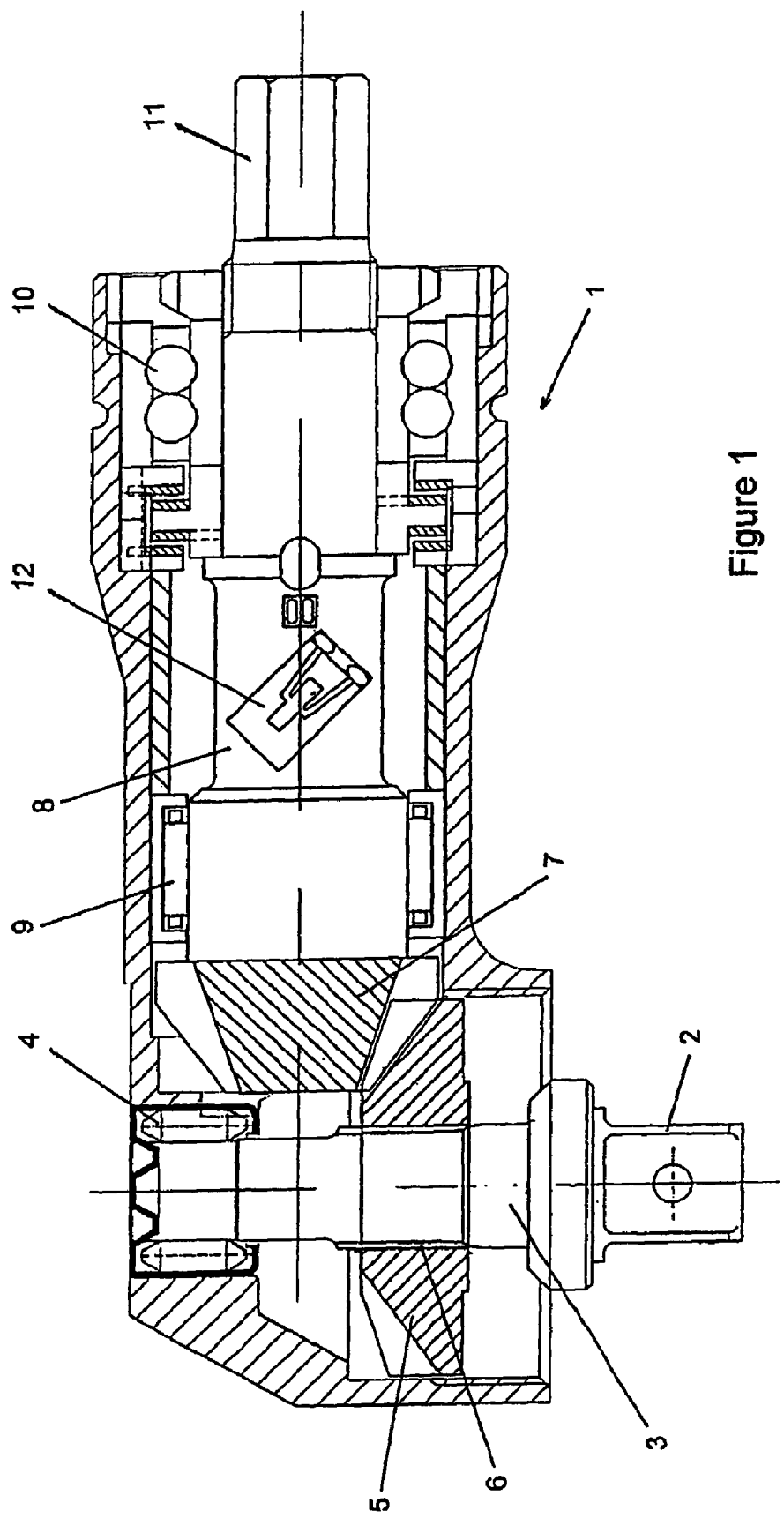
FIG. 1 is an axial section through a working head of a known nutrunner incorporating a torque sensor.

Referring first to FIG. 1, a drive head 1 of a known powered nutrunner comprises an output square drive head 2 mounted at one end of a splined shaft 3. The shaft 3 is mounted on bearings, of which the upper bearing 4 is shown. A bevel gear 5 is drivingly connected to the shaft 3 by cooperating splines 6 on the shaft and gear.

A second bevel gear 7 is a drive gear for the shaft 3 and drive head 2 and is mounted on a drive shaft 8 which is arranged perpendicularly to the shaft 3. The drive shaft 8 is mounted between bearings 9 and 10 and terminates in a hexagonal head 11 which in use receives a drive from a motor (not shown) which could for example be air or electric powered through a gearbox (not shown) both of which are located within a side handle of the nutrunner.

A torque sensor is built into the known powered nutrunner of FIG. 1 and comprises a strain gauge 12 mounted on the drive shaft 8 between the bearings 9 and 10. The strain in the drive shaft 8 sensed by the strain gauge 12 is transmitted by wire or by a wireless link to a CPU and display (not shown) where the measured strain is converted and displayed as a measure of the applied torque. The strain gauge 12 could be a conventional strain gauge or one the uses Surface Acoustic Wave (S.A.W.) technology.

The strain gauge 12 measures the strain at the drive shaft 8 between the bearings 9 and 10, and not at the output square drive head 2. Errors can occur due to friction at the bearings 9 and 4, friction between the bevel gears and side loads exerted on the handle of the nutrunner in use, and those errors cannot adequately be compensated in the nutrunner of FIG. 1. The calculated and displayed torque is therefore never a completely accurate indication of the torque exerted by the square drive head 2.

Figure 2:
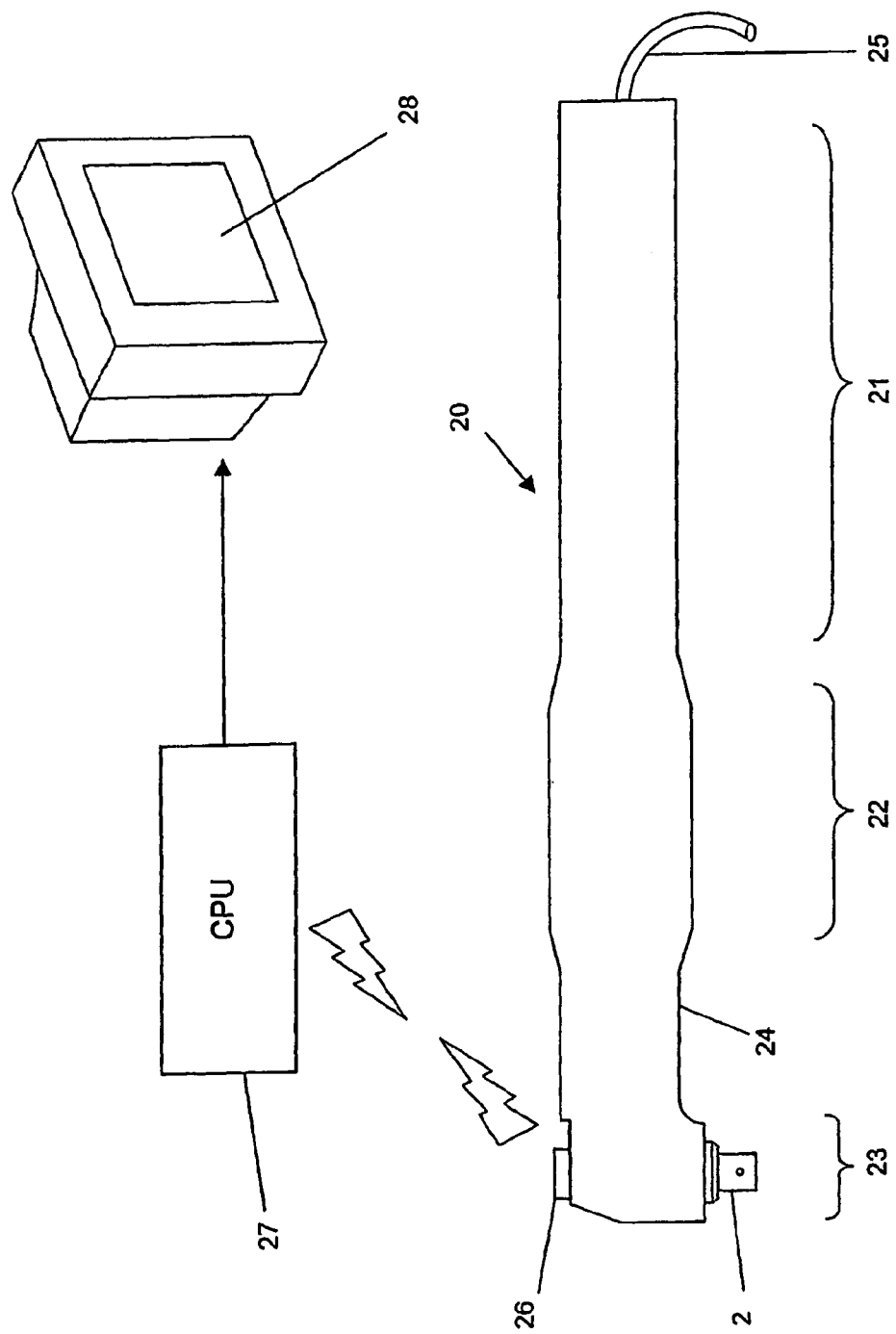
FIG. 2 is a schematic assembly view of a complete nutrunner according to the invention together with an associated CPU and visual display for the sensed torque.

FIGS. 2 to 6 illustrate a powered nutrunner according to the invention. FIG. 2 shows the nutrunner, indicated 20, in side view. The nutrunner 20 has a motor portion 21, a gearbox portion 22 and a drive head portion 23 all enclosed in a housing 24. The drive head portion 23 includes an output square drive head which is identical to that of FIG. 1 and which has therefore been given the same reference numeral 2.

Power to the electric motor contained in the motor portion 21 is supplied through a power cable 25. The motor is a high speed low torque motor whose output is converted by the gearbox portion 22 to a low speed high torque drive to the output square drive head 2.

FIG. 2 also shows a cover 26 for a torque sensor assembly which is described in detail below. A patch antenna (not shown) transmits torque output signals to a CPU 27 which enables torque data to be displayed at 28.

Figure 4:
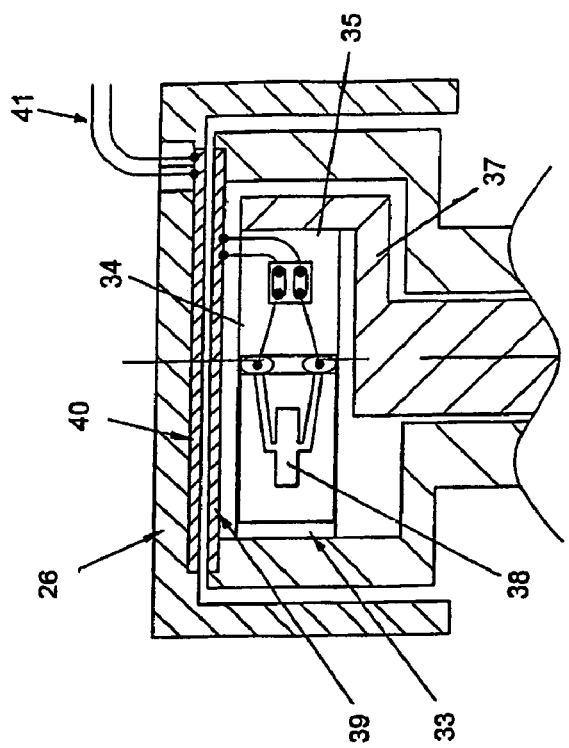
FIG. 4 is an enlarged detail of the torque sensing portion of the nutrunner of FIG. 2.
Figure 3:
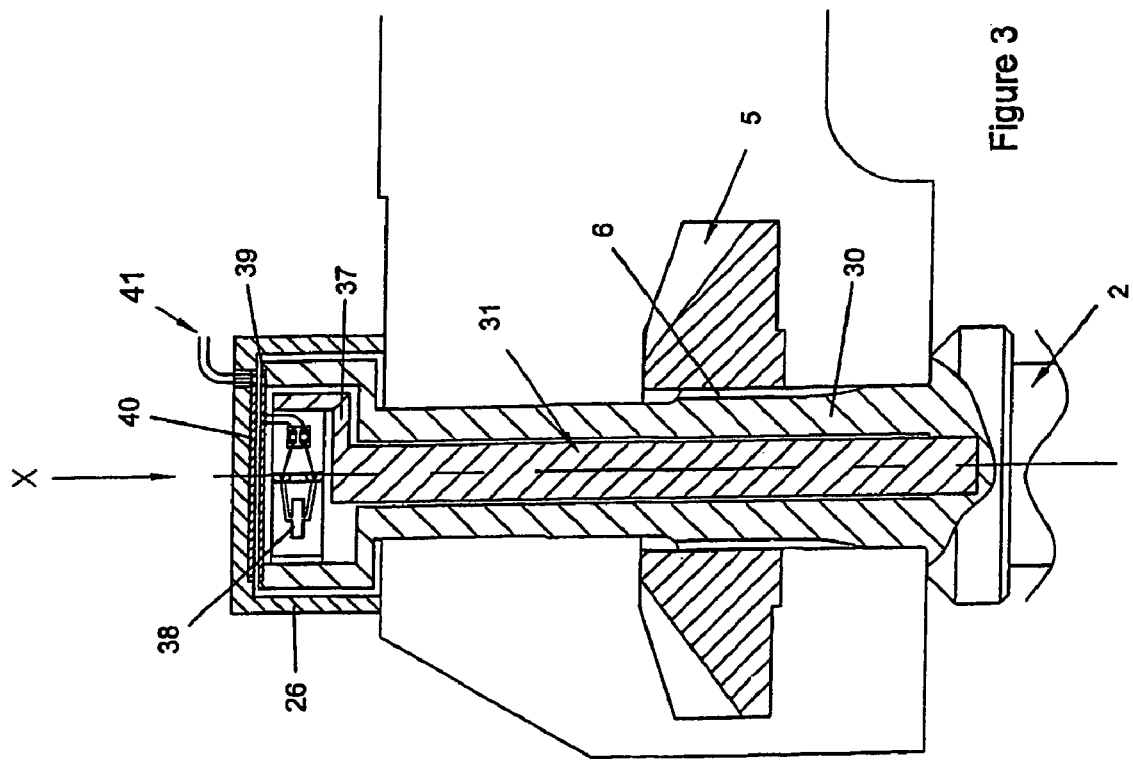
FIG. 3 is an axial section through a part only of a working head of the nutrunner of FIG. 2.

FIGS. 3 and 4 illustrate the connection of the torque sensors to the square drive head 2. The drive head 2 is formed or mounted on an end of a quill shaft 30 which is externally splined at 6 to receive the input drive from a bevel gear 5. The spline connection 6 and the bevel gear 5 are numbered with the same reference numerals as those used in FIG. 1 to signify that the parts and functions are equivalent between the two drawings.

The quill shaft 30 illustrated in FIG. 2 has a slightly reduced thickness wall at 30a, to facilitate slight flexure of the quill shaft under strain when the nutrunner applies torque to a rotary fastener in use. Such a wall thickness reduction is not necessary however, as long as the quill shaft has an appropriate degree of flexibility. Torque exerted between the bevel gear 5 and the output square drive head 2 manifests itself as that slight flexure of the quill shaft 30 between those two points. To measure that flexure a central shaft 31 is secured fast to the bottom end of the quill shaft 30 immediately adjacent the output square drive head 2 and extends up through the hollow centre of the quill shaft and into the cover 26.

Figure 5:
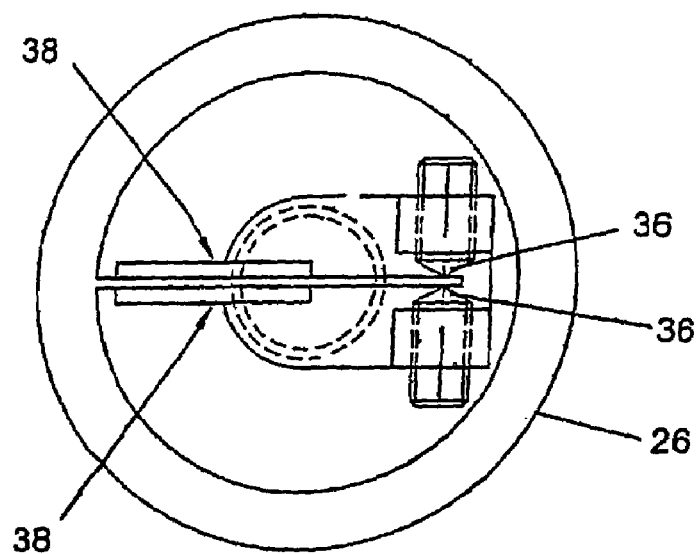
FIG. 5 is a view from above in the direction of the arrow X of FIG. 2 with the cover and both inductive elements removed.
Figure 6:
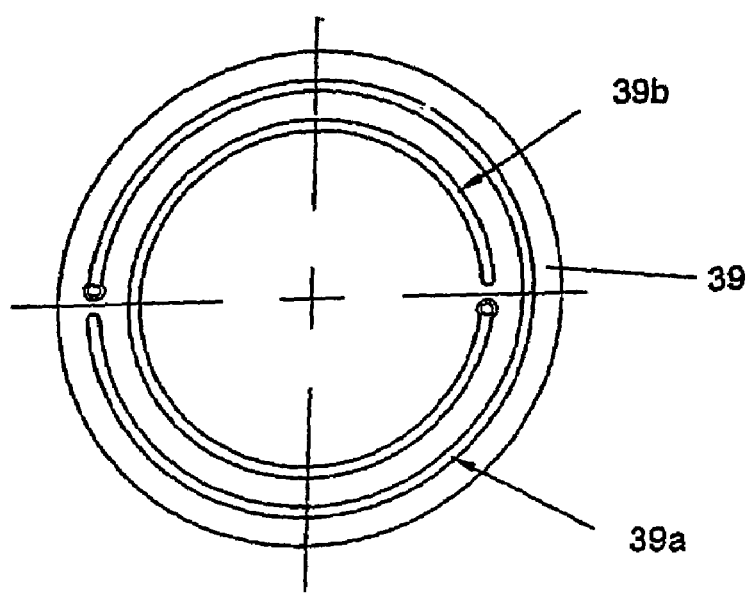
FIG. 6 is a view similar to that of FIG. 5 but with only the upper one of the two inductive elements removed.

Within the cover 26 the top end of the quill shaft 30 opens out into a cup portion 32 which mounts one end 33 of a flexible cantilever beam 34. The other end 35 of the cantilever beam 34 is gripped between fulcrum points 36 of a cranked end portion 37 of the central shaft 31. The fulcrum points 36 are not shown in FIGS. 3 and 4 but are illustrated in FIG. 5.

Secured to opposed outer faces of the flexible cantilever beam 34 are a pair of strain gauges 38, one on each outer face of the beam. Analogue strain gauges may be used, but the strain gauges 38 are preferably S.A.W. devices which are highly accurate in measuring small strain readings and have a digital output which assists the further processing of their output signals.

The outputs of the strain gauges 38 are fed to the respective tracks 39a and 39b of a rotary coupling element 39 which is mounted on the cup portion 32. The rotary coupling element 39 transmits energy to a non-rotary coupling element 40 mounted on the inside of the cover 26. In the steady state, when the output square drive head 2 has stopped rotating and the nut or other rotary fastener element being tightened has stopped rotating, the signals from the coupling element 39 wired to the strain gauges 38 are thus coupled to the coupling 40 stably mounted within the cover 26.

The output signal from the coupling element 40 is shown in FIGS. 3 and 4 as issuing down wire leads 41. From there, the signal may be hard-wired to the CPU 27 (FIG. 2) or may be transmitted to the CPU through a wireless connection which may be by an IR, radio wave or other suitable link.

The strain gauges 38, although mounted at the end of the quill shaft 30 remote from the output square drive 2, accurately reflect the angular deflection in the quill shaft between the bevel gear 5 and the output square drive. Distortion of the output reading (representing sensed torque) by applied side loads on the nutrunner tool handle is reduced to a minimum, as any side load applied to the quill shaft is also applied to the central shaft 31. The output reading of applied torque, displayed at the display 28, is therefore an accurate display of the torque actually applied by the output drive head 2. Moreover the signal-to-noise ratio of the output is extremely high when S.A.W. transducers are used as described, and the provision of S.A.W. transducers on opposite sides of the beam 34 with mutually different frequencies of for example 200 MHz and 201 MHz respectively provides excellent signal separation with very little cross-talk.

What is claimed is:

1. A torque applying tool comprising a torque wrench or nutrunner having handle means and a drive head for torque output, and means for sensing the output torque applied by the drive head;
    wherein the drive head is located at one end of a hollow quill shaft an outer diameter of which is splined to receive a torque drive input from the handle at a location axially spaced from the drive head;
    a central shaft extends from the drive head up the hollow center of the quill shaft; and
    the ends of the hollow quill shaft and the central shaft remote from the drive head mount opposite ends of a flexible cantilever beam on a face of which or on opposed faces of which are mounted one or more strain sensing transducers the output or outputs of which represent sensed torque applied by the drive head.

2. A tool according to claim 1, wherein the tool comprises two of the strain sensing transducers mounted on opposed faces of the cantilever beam.

3. A tool according to claim 1, wherein the outputs of the one or more strain sensing transducers are transmitted by a radio frequency coupling between a rotary coupling element connected to the drive head and a non-rotary coupling element in the handle means.

4. A tool according to claim 3, wherein the output signal representing sensed torque applied by the drive head is transmitted from a patch antenna carried by the handle means and receiving as input the output from the non-rotary coupling element.

5. A tool according to claim 1, wherein each of the strain sensing transducers is a surface acoustic wave transducer.

6. A tool according to claim 1, wherein the tool is a nutrunner and torque drive input to the hollow quill shaft is provided through a bevel gear splined to the quill shaft at the location axially spaced from the drive head.

7. A tool according to claim 6, wherein motive power to the bevel gear is provided from a motor through a gearbox and another cooperating bevel gear.

8. A tool according to claim 1, wherein the tool is a torque wrench and torque drive input to the hollow quill shaft is provided through the handle means splined to the quill shaft at the location axially spaced from the drive head.

9. A torque applying tool comprising a torque wrench or nutrunner having handle means and a drive head for torque output, and means for sensing the output torque applied by the drive head;
- wherein the drive head is located at one end of a hollow quill shaft an outer diameter of which is splined to receive a torque drive input from the handle at a location axially spaced from the drive head;
- a central shaft extends from the drive head up the hollow centre of the quill shaft;
- wherein the ends of the hollow quill shaft and the central shaft remote from the drive head mount opposite ends of a flexible cantilever beam on a face of which or on opposed faces of which are mounted one or more strain sensing transducers the output or outputs of which represent sensed torque applied by the drive head; and
- the outputs of the one or more strain sensing transducers are transmitted to a non-rotary element in the handle means via slip rings or across an air gap.

10. A tool according to claim 9, wherein the outputs of the one or more strain sensing transducers are transmitted by a radio frequency coupling between a rotary coupling element connected to the drive head and the non-rotary coupling element in the handle means.

11. A tool according to claim 9, wherein each of the strain sensing transducers is a surface acoustic wave transducer.

12. A tool according to claim 9, wherein the output signal representing sensed torque applied by the drive head is transmitted from a patch antenna carried by the handle means and receiving as input the output from the non-rotary coupling element.

13. A tool according to claim 9, wherein the tool is a nutrunner and torque drive input to the hollow quill shaft is provided through a bevel gear splined to the quill shaft at the location axially spaced from the drive head.

14. A tool according to claim 13, wherein motive power to the bevel gear is provided from a motor through a gearbox and another cooperating bevel gear.

15. A tool according to claim 9, wherein the tool is a torque wrench and torque drive input to the hollow quill shaft is provided through the handle means splined to the quill shaft at the location axially spaced from the drive head.

16. A torque applying tool comprising a torque wrench or nutrunner having handle means and a drive head for torque output, and means for sensing the output torque applied by the drive head;
- wherein the drive head is located at one end of a hollow quill shaft an outer diameter of which is splined to receive a torque drive input from the handle at a location axially spaced from the drive head;
- a central shaft extends from the drive head up the hollow centre of the quill shaft;
- wherein the ends of the hollow quill shaft and the central shaft remote from the drive head mount opposite ends of a flexible cantilever beam on a face of which or on opposed faces of which are mounted one or more strain sensing transducers the output or outputs of which represent sensed torque applied by the drive head;
- wherein the outputs of the one or more strain sensing transducers are transmitted by a radio frequency inductive coupling between a rotary first induction coupling element connected to the drive head and a non-rotary second induction coupling element in the handle means; and
- the output signal representing sensed torque applied by the drive head is transmitted from a patch antenna carried by the handle means and receiving as input the output from the second induction element or set of induction elements.

17. A tool according to claim 16, wherein each of the strain sensing transducers is a surface acoustic wave transducer.

18. A tool according to claim 16, wherein the tool is a nutrunner and torque drive input to the hollow quill shaft is provided through a bevel gear splined to the quill shaft at the location axially spaced from the drive head.

19. A tool according to claim 16, wherein motive power to the bevel gear is provided from a motor through a gearbox and another cooperating bevel gear.

20. A tool according to claim 16, wherein the tool is a torque wrench and torque drive input to the hollow quill shaft is provided through the handle means splined to the quill shaft at the location axially spaced from the drive head.

* * * * *